United States Patent [19]
Krech, Jr. et al.

[11] Patent Number: 5,664,114
[45] Date of Patent: Sep. 2, 1997

[54] ASYNCHRONOUS FIFO QUEUING SYSTEM OPERATING WITH MINIMAL QUEUE STATUS

[75] Inventors: Alan S. Krech, Jr.; Noel D. Scott, both of Fort Collins, Colo.

[73] Assignee: Hewlett-Packard Company, Palo Alto, Calif.

[21] Appl. No.: 442,543

[22] Filed: May 16, 1995

[51] Int. Cl.⁶ .................................................. G06F 12/00
[52] U.S. Cl. ..................... 395/200.64; 395/872; 395/873; 395/876; 395/877
[58] Field of Search .......................... 395/250, 853, 395/854, 855, 876, 877, 872, 873

[56] References Cited

U.S. PATENT DOCUMENTS

| | | | |
|---|---|---|---|
| 5,021,994 | 6/1991 | Tai et al. | 395/250 |
| 5,097,442 | 3/1992 | Ward et al. | 365/78 |
| 5,172,228 | 12/1992 | Israelsen | 348/422 |
| 5,283,899 | 2/1994 | Cook et al. | 395/800 |
| 5,296,936 | 3/1994 | Pittas et al. | 358/407 |
| 5,299,315 | 3/1994 | Chin et al. | 395/250 |
| 5,442,747 | 8/1995 | Chan et al. | 395/509 |
| 5,448,558 | 9/1995 | Gildea et al. | 370/412 |
| 5,455,907 | 10/1995 | Hess et al. | 395/507 |
| 5,455,913 | 10/1995 | Shrock et al. | 395/280 |
| 5,469,223 | 11/1995 | Kimura | 348/581 |

*Primary Examiner*—Kenneth S. Kim

[57] ABSTRACT

An enhanced performance queuing system that includes a FIFO queue in an electronic device, where the FIFO queue is controlled by a FIFO queue controller that also provides FIFO queue status relating to space available in the FIFO queue. A first device writes data to the FIFO queue in data chunks or in data item increments within a data chunk. FIFO queue status is requested only to determine if a data chunk sized space is free prior to writing to a data chunk space in the FIFO queue, rather than polling for FIFO queue status prior to each write operation. A second device reads data from the FIFO queue in data chunks or data item increments from within a data chunk. The first device begins writing to the FIFO queue prior to signaling the second device to begin reading, so that the second device can read from the FIFO queue without ever catching up with the first device thereby eliminating the need for requesting FIFO queue status to determine if data is available for reading.

17 Claims, 8 Drawing Sheets

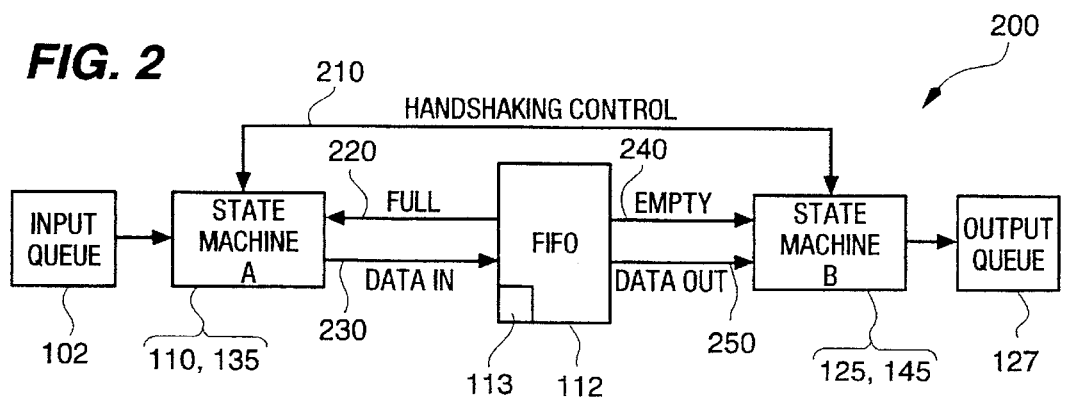
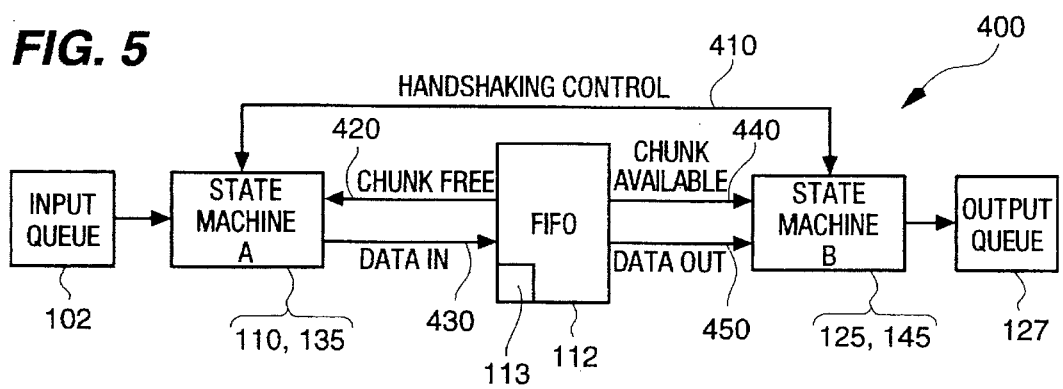
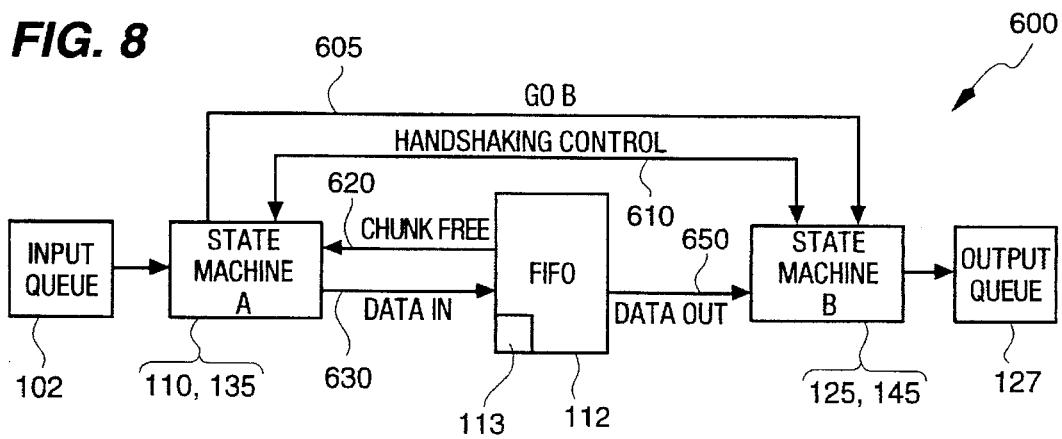

ASYNCHRONOUS FIFO QUEUING SYSTEM OPERATING WITH MINIMAL QUEUE STATUS

BACKGROUND OF THE INVENTION

1. Field of the Invention

This invention relates to queuing systems, and in particular to an enhanced performance First In First Out (FIFO) queuing system having minimal implementation logic and polling requirements.

2. Description of the Related Art

It is a problem in the field of high-performance low-cost graphics accelerator circuits used in three-dimensional imaging devices, to implement an efficient, high-performance queuing system requiring minimal circuit implementation space and minimal status polling requirements. The need to implement smaller and more efficient queuing systems in graphics accelerator circuits, as well as in other electronic devices, is a result of products being designed to provide maximum processing performance and efficiency in increasingly limited circuit space environments.

A traditional FIFO queuing system has at least one electronic device, component, and/or process, generically called device "A", that writes to a FIFO queue, and at least one other electronic device, component, and/or process, generically called device "B", that reads from the same FIFO queue. It is useful for device A to know if space is available to write to the FIFO queue, and for device B to know if data is available to read from the FIFO queue. Traditional FIFO queuing systems resolve the space/data availability issue by requiring that device A poll a FIFO queue controller prior to each write operation to determine if space is available to write to the FIFO queue. If the FIFO queue controller responds with a "full" indication, then device A must wait and repeatedly poll the FIFO queue controller until it is determined that space is available to write to the FIFO queue. In the mean time, device A is unable to perform additional processing until the present processing result is written to the FIFO queue.

Similarly, device B is required to poll the FIFO queue controller prior to each read operation to determine if data is available to read from the FIFO queue. If the FIFO queue controller responds with an "empty" indication, then B must wait and repeatedly poll the FIFO queue controller until data is available to read from the FIFO queue. In the mean time, device B is unable to perform additional processing until new data is available from the FIFO queue. However, the seemingly simple logic required to implement a traditional FIFO queuing system such as the one described above, is too large, and the repeated status polling prior to each read/write operation too costly, for use by FIFO queuing systems implemented in high-performance electronic devices having limited circuit space and no tolerance for status polling that wastes processing time.

For these reasons, traditional FIFO queuing systems fail to meet the circuit implementation space requirements and processing performance requirements of high-performance electronic devices such as the graphics accelerator circuits used in three-dimensional imaging devices. The need for an efficient high-performance FIFO queuing system has heretofore not been satisfied.

SUMMARY OF THE INVENTION

The above described problems are solved and a technical advance achieved in the field by the queuing system of the present invention. The queuing system is embodied in a graphics accelerator circuit having a plurality of electronic devices therein, including a first state machine "A", and a second state machine "B", both electrically connected to a FIFO queue controlled by a FIFO queue controller and operating asynchronously with respect to each other. State machine A partially processes data and outputs the results to the FIFO queue. State machine B reads the data from the FIFO queue, further processes the data, and outputs the results to other downstream hardware.

A first queuing system enhancement is realized by reducing the amount of FIFO queue status polling that is required prior to reading from or writing to the FIFO queue. Rather than the FIFO queue controller simply returning a "full" indication to a FIFO queue status request, the FIFO queue controller returns information relating to the amount of available space in the FIFO queue. Because state machine A can determine how much data can be stored in an amount of available FIFO queue space, state machine A can poll for FIFO queue status once, and thereafter perform a plurality of calculations that produce a plurality of outputs that are written to the available FIFO queue space without repeated polling interruptions prior to each write operation. The result is a more efficient queuing system because the FIFO queue space is known to exist prior to producing output to write to the FIFO queue. The plurality of outputs are referred to as a "data chunk" where each one of the plurality of outputs are a "data item." A data chunk may be written in data item increments to the available data chunk space in the FIFO queue, or a data chunk may be written to the FIFO queue as an entire data chunk at one time for additional write operation efficiency. The preferred embodiment writes data in data item increments within a data chunk.

Similarly, rather than the FIFO queue controller returning an "empty" indication to a FIFO queue status request prior to a read operation, the FIFO queue controller returns information relating to the presence of data in the FIFO queue. The presence of data may indicate that at least one data chunk is available in the FIFO queue, or that at least one data item within at least one data chunk is available in the FIFO queue. State machine B need only poll for FIFO queue status once to determine if a data chunk is available, and thereafter read data in data item increments for an entire data chunk, or read data in whole data chunk increments for additional read operation efficiency. No repeated polling interruptions occur prior to each read operation. Alternatively, state machine B can poll for FIFO queue status once prior to reading data from the FIFO queue, and thereafter never request FIFO queue status for any reason provided that state machine B is known to read data at the same rate or slower than state machine A can write data to the same FIFO queue. In the latter alternative, state machine A obtains a head start writing data to the FIFO queue so that state machine B can continue reading from the FIFO queue without ever catching up with state machine A.

The second queuing system enhancement includes the first enhancement, in addition to controllably delaying the start of state machine B until such time as state machine A signals state machine B by way of a signal lead. State machine A writes data to the FIFO queue as discussed in the first queuing system enhancement above. Once a predetermined amount of data is written to the FIFO queue, state machine A signals state machine B to begin reading from the FIFO queue. Because state machine B reads data from the FIFO queue at the same rate or slower than state machine A can write to the FIFO queue, state machine B will always have data to read and will never catch up with state machine A. The result is a smaller circuit implementation and no polling requirement prior to reading.

BRIEF DESCRIPTION OF THE DRAWINGS

FIG. 2 illustrates a traditional FIFO queuing system in block diagram form;

FIG. 5 illustrates an improved FIFO queuing system in block diagram form;

FIG. 8 illustrates the preferred embodiment for an enhanced FIFO queuing system in block diagram form;

DESCRIPTION OF THE PREFERRED EMBODIMENT

Figure 1:
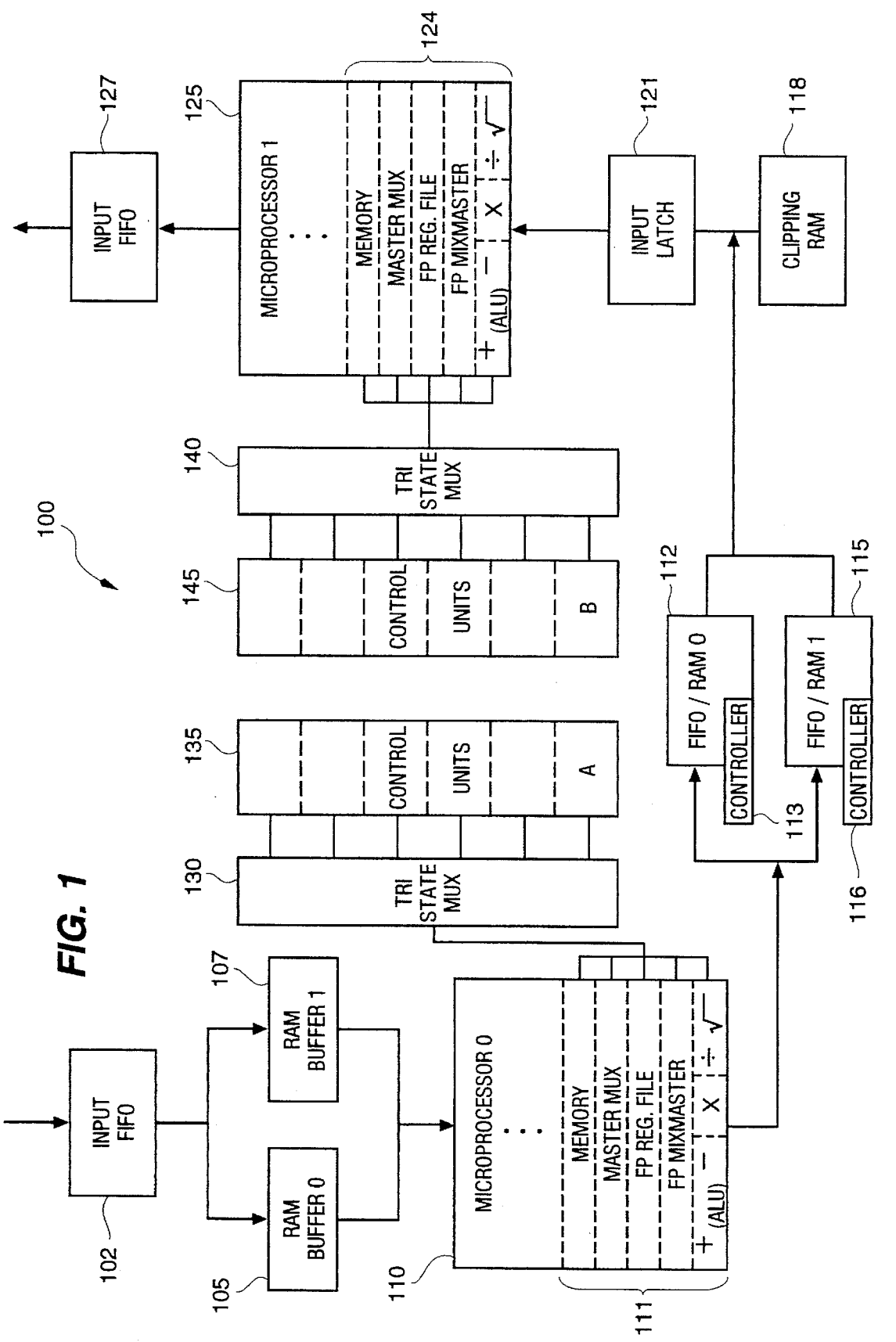
FIG. 1 illustrates a graphics accelerator block diagram containing a high-speed FIFO queue.

Graphics Accelerator Architecture—FIG. 1

FIG. 1 illustrates a graphics accelerator hardware architecture 100 used in three-dimensional imaging devices. The architecture disclosed in FIG. 1 is an example for illustration only and is not a limitation on the present invention due to any particular hardware architecture or implementation.

Although traditional graphics accelerators are floating point intensive architectures implemented in software and/or as general micro-coded processors, the fundamental difference between architecture 100 and traditional graphics accelerator architectures is that architecture 100 contains hard-wired control features, dynamic logic floating point mega-cells, and highly customized fixed data paths. Specifically, architecture 100 is designed to perform geometric matrix transformations, polygon decompositions, object lighting/shading, clipping, perspective adjustments, and plane/slope equation calculations on randomly oriented polygons and/or vectors. The typical polygon processed by the present architecture 100 is a three or four sided polygon.

Architecture 100 is designed to support a larger overall three-dimensional processing scheme by quickly and efficiently processing only the most common primitives having the most commonly processed features to facilitate further processing by downstream hardware. Because architecture 100 is implemented in an environment afforded minimal circuit space and little excess processing time, there is a need to increase overall processing efficiency and implement smaller circuit designs in an effort to maximize the use of available circuit space and maintain high-performance standards.

Architecture 100 is a two-processor vector processing design having a first micro-processor 110 controlled by control units 135, and a second microprocessor 125 controlled by control units 145, that will be referred to for discussion purposes as state machine "A" and state machine "B" respectively. Operationally, the state machine A preprocesses vertex primitives input by way of a traditional FIFO queue 102. Dual Random Access Memory (RAM) buffers 105 and 107 provide a staging area from which primitives are accessed by micro-processor 110. Micro-processor 110 performs initial floating point operations on input primitives including, but not limited to, geometric transformations, partial slope calculations, and other preliminary calculations prior to handing the results off to micro-processor 125 by way of FIFO/RAM memory 112 or 115. Micro-processor 110 includes a plurality of processor elements 111 including, but not limited to, on board memory, a master multiplexer, registers, and other floating point components. Control units 135 provide processing instruction to the processor elements 111 such as address decoding, transformations, decompositions, and positional assistance.

FIFO/RAM memory devices 112 and 115 are controlled by memory controllers 113 and 116, respectively, which implement both a hybrid FIFO/RAM memory scheme and the enhanced performance queuing system of the present invention. Depending on the primitive type being processed and the calculations being performed, either memory 112 and/or 115 may be used as a FIFO queue or a RAM memory at the appropriate time. When used as a FIFO queue, memory 112 or 115 facilitates the data handoff from state machine A to state machine B using the enhanced queuing system of the present invention.

Output from memory devices 112 and 115 are integrated with light position, intensity, color, and direction output from the clipping RAM staging device 118. The combined data is directed into the input latch queue 121 for processing by micro-processor 125. Micro-processor 125 contains its own processor elements 124 including, but not limited to, on board memory, a master multiplexor, registers, and other floating point components. Control units 145 control processor elements 124 and provide processing instructions such as lighting assists, clipping, and plane equations. Completed operations from micro-processor 125 are output on a traditional FIFO queue 127 for subsequent processing by downstream hardware beyond the scope of this disclosure.

Figure 3:
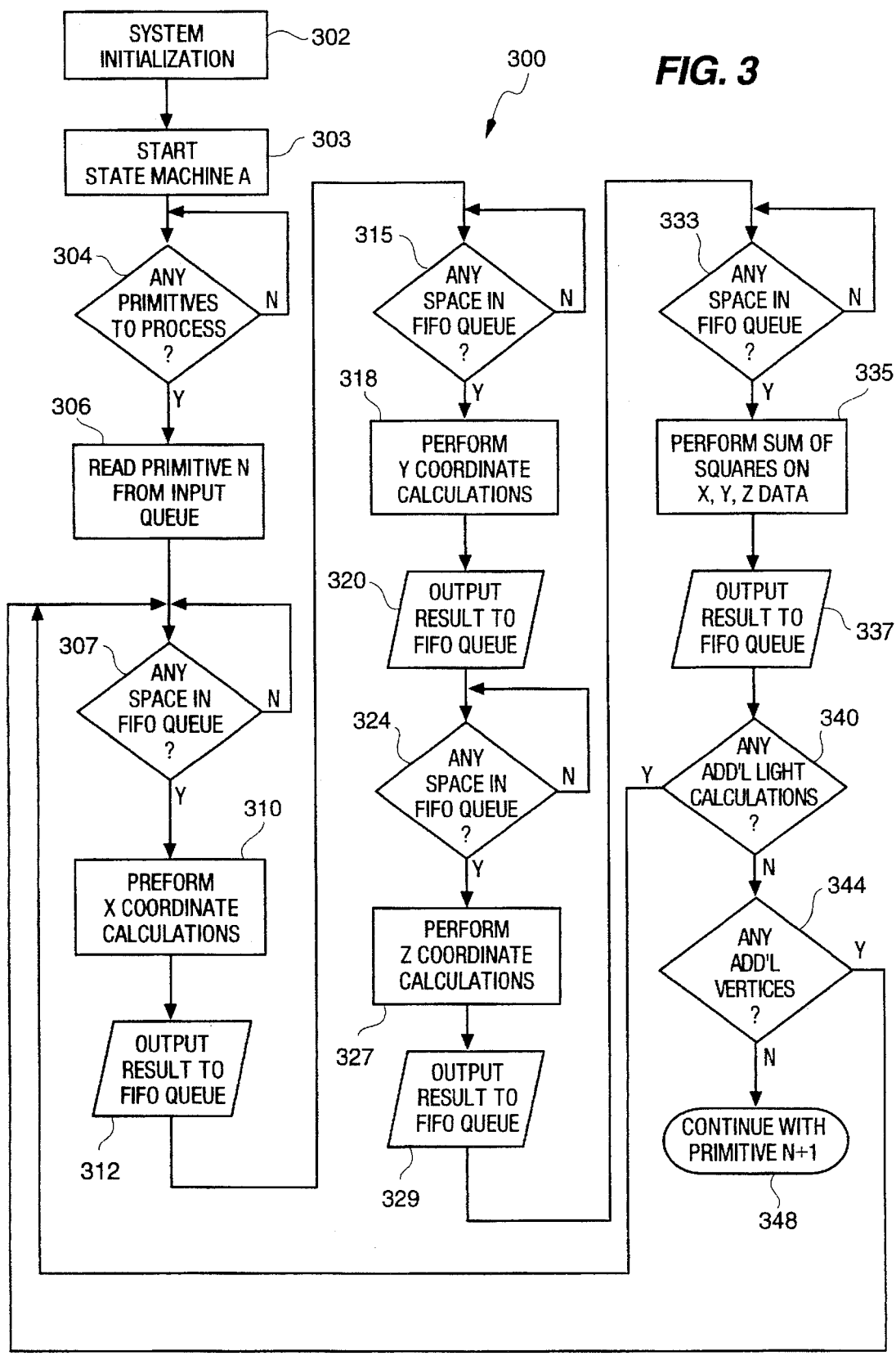
FIG. 3 illustrates operational steps for a write controller in a traditional FIFO queuing system in flow diagram form.
Figure 4:
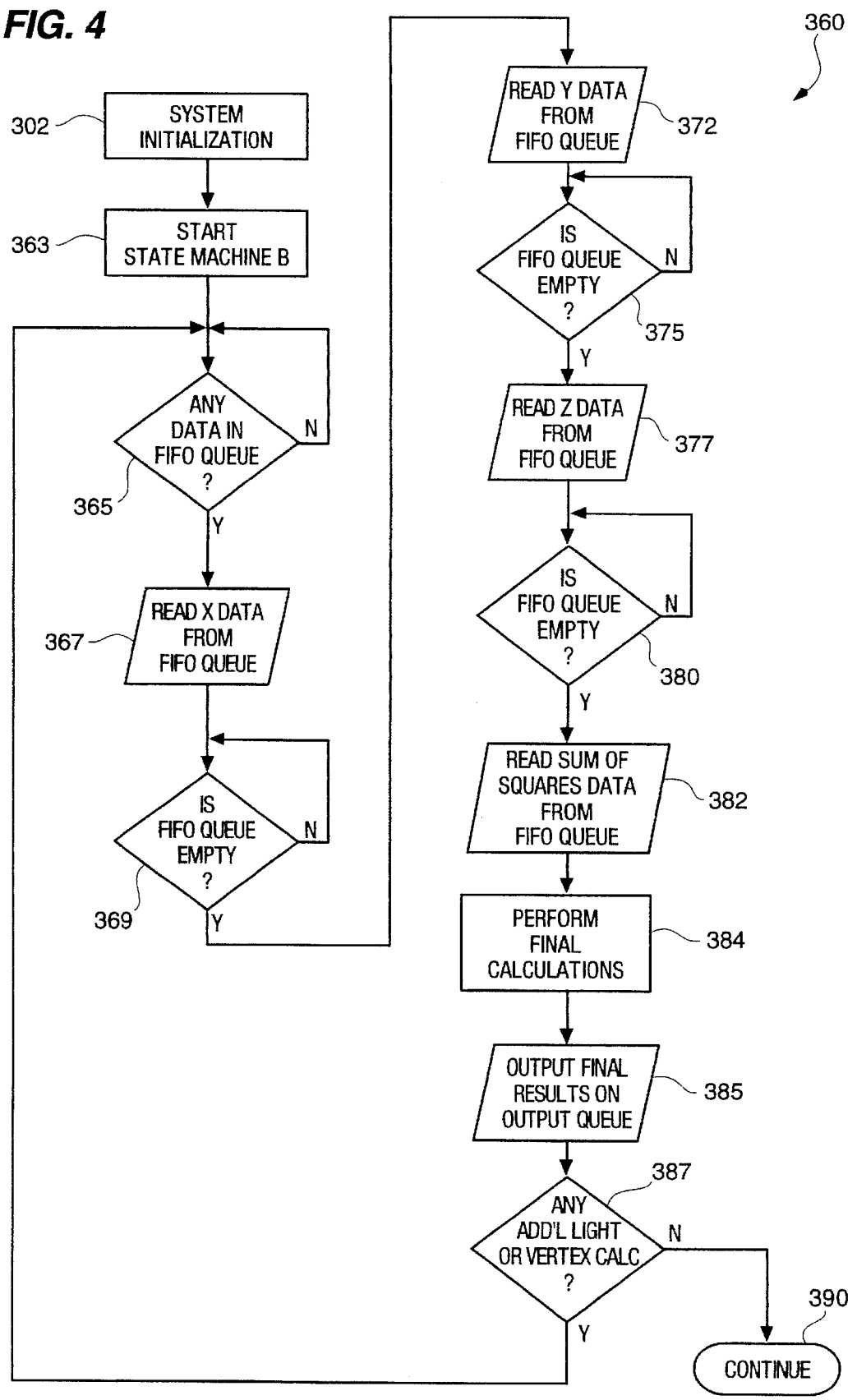
FIG. 4 illustrates operational steps for a read controller in a traditional FIFO queuing system in flow diagram form.

Traditional FIFO Queuing System—FIGS. 2, 3, 4

A common processing scenario will be used when discussing and illustrating the difference between a traditional FIFO queuing system and the enhanced queuing system embodiments of the present invention. The processing scenario highlights the amount of FIFO queue controller polling and read/write memory accessing that is required by state machines A and B to fully process a three-dimensional quadrilateral primitive having eight lights enabled for each of four vertices. The specific calculations required to complete the processing are beyond the scope of this example. However, calculations for the basic x-y-z-coordinates in a three-dimensional primitive are identified as at the relative point where processing would occur for illustration purposes. The quadrilateral example is for illustration only and is not intended as a limitation on the present invention.

FIG. 2 illustrates a traditional FIFO queuing system 200 for a vector processing system. The FIFO queue 112 serves a first state machine "A" including micro-processor 110 controlled by control units 135, and a second state machine "B" including micro-processor 125 controlled by control units 145. State machines A and B communicate and coordinate activities between each other by handshaking control 210 as needed. Input queue 102 provides primitive data to state machine A to process. Output queue 127 queues processed primitives from state machine B for subsequent distribution to downstream hardware as needed.

State machine A is connected to FIFO queue 112 by a status lead 220 and data path 230. Status lead 220 is used by FIFO queue controller 113 to communicate FIFO queue status to state machine A when state machine A polls for such information. The FIFO queue status indicates when the FIFO queue 112 is "full". Data path 230 is used by state machine A to output processed data to FIFO queue 112.

State machine B is connected to FIFO queue 112 by a status lead 240 and a data path 250. Status lead 240 is used by FIFO queue controller 113 to communicate FIFO queue 112 status to state machine B when state machine B polls FIFO queue controller 113 for such information. FIFO queue controller 113 returns a FIFO queue "empty" status when no data is available in FIFO queue 112. Data path 250 is used by state machine B to read data from FIFO queue 112 when state machine B is ready to complete processing.

Based on the FIFO queuing system 200 illustrated in FIG. 2, FIG. 3 illustrates the traditional operational interactions between state machine A and FIFO queue 112. The number of FIFO queue 112 status polls and/or write accesses required by state machine A to complete processing a quadrilateral primitive using the traditional queuing system 200, is 4*(8*4)=128 operations. That is, there are four calculations required for each of four vertices that contain eight lighting requirements.

State machine A is started at step 303 in FIG. 3 following system initialization at step 302 for the system containing queuing system 200. Once state machine A is initialized and operational, state machine A determines whether there are any primitives available to process at decision step 304. If no primitives are available to process, then state machine A continues to idle at decision step 304. When a primitive is finally available, the primitive is read from the input queue 102 at step 306. Once the primitive is read at step 306, state machine A begins processing the primitive.

As a first step, state machine A polls the FIFO queue controller 113 at decision step 307 to determine if any FIFO queue 112 space is available. If no space is available, state machine A does no further processing on this primitive and idles at decision step 307 until FIFO queue 112 space is available. When FIFO queue 112 space is available, state machine A performs x-coordinate calculations at step 310 and writes the results to FIFO queue 112 at step 312.

State machine A polls the FIFO queue controller 113 at decision block 315, to determine if any FIFO queue 112 space is available. If the FIFO queue 112 status response indicates that no space is available, state machine A does no further processing on this primitive and idles at decision step 315 until FIFO queue 112 space is available. When FIFO queue 112 space is available, state machine A performs y-coordinate calculations at step 318 and outputs the results to FIFO queue 112 at step 320. The polling, calculating, and writing steps continue for the z-coordinate calculations at steps 324, 327, and 329, and for the sum of squares of the x-y-z-coordinates collectively at steps 333, 335, and 337.

Because the present quadrilateral primitive scenario has eight lights enabled for each of four vertices, decision step 340 controls the eight light cycles through processing steps 307–337, and decision step 341 controls the four vertex cycles through processing steps 307–340. When all lights are processed for each vertex, processing falls through decision block 340 and 341, respectively, and state machine A can begin processing a subsequent primitive at step 348.

FIG. 4 illustrates the traditional operational steps as state machine B reads data from the FIFO queue 112. State machine B is started at step 363 in FIG. 4, following system initialization at step 302 for the traditional queuing system 200. Because state machine B is started at the same time as state machine A following system initialization at step 302, state machine B must repeatedly poll FIFO queue controller 113 at decision step 365 until state machine A finally writes data to FIFO queue 112. Once state machine B receives a "not empty" status indication from FIFO queue controller 113 at decision step 365, state machine B reads the x-coordinate data from FIFO queue 112 at step 367. State machine B continues polling and reading from FIFO queue 112 at steps 369–382 until the y-coordinate, z-coordinate, and the x-y-z-coordinate sum of squares data, is read from FIFO queue 112.

Once all data is read by state machine B, final calculations are performed on the primitive at step 384. The results are output to output queue 127 at step 385. Because there are eight light cycles for each of four vertices. Decision step 387 repeats processing steps 365–385 eight times for each of the four vertices. When all vertices have been processed at decision step 387, state machine B continues processing other data as needed at step 390.

Figure 6:
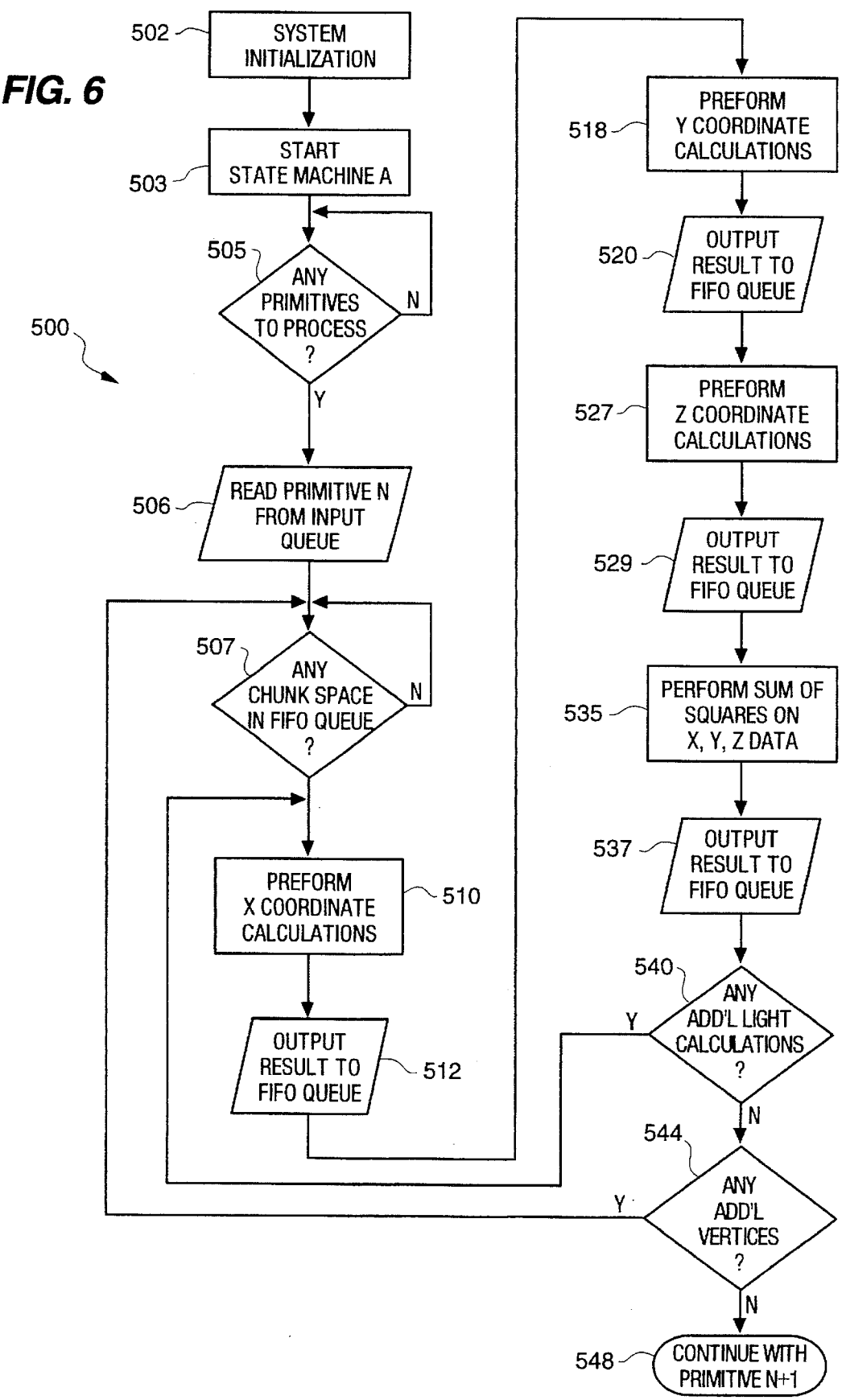
FIG. 6 illustrates operational steps for a write controller in an improved FIFO queuing system in flow diagram form.
Figure 7:
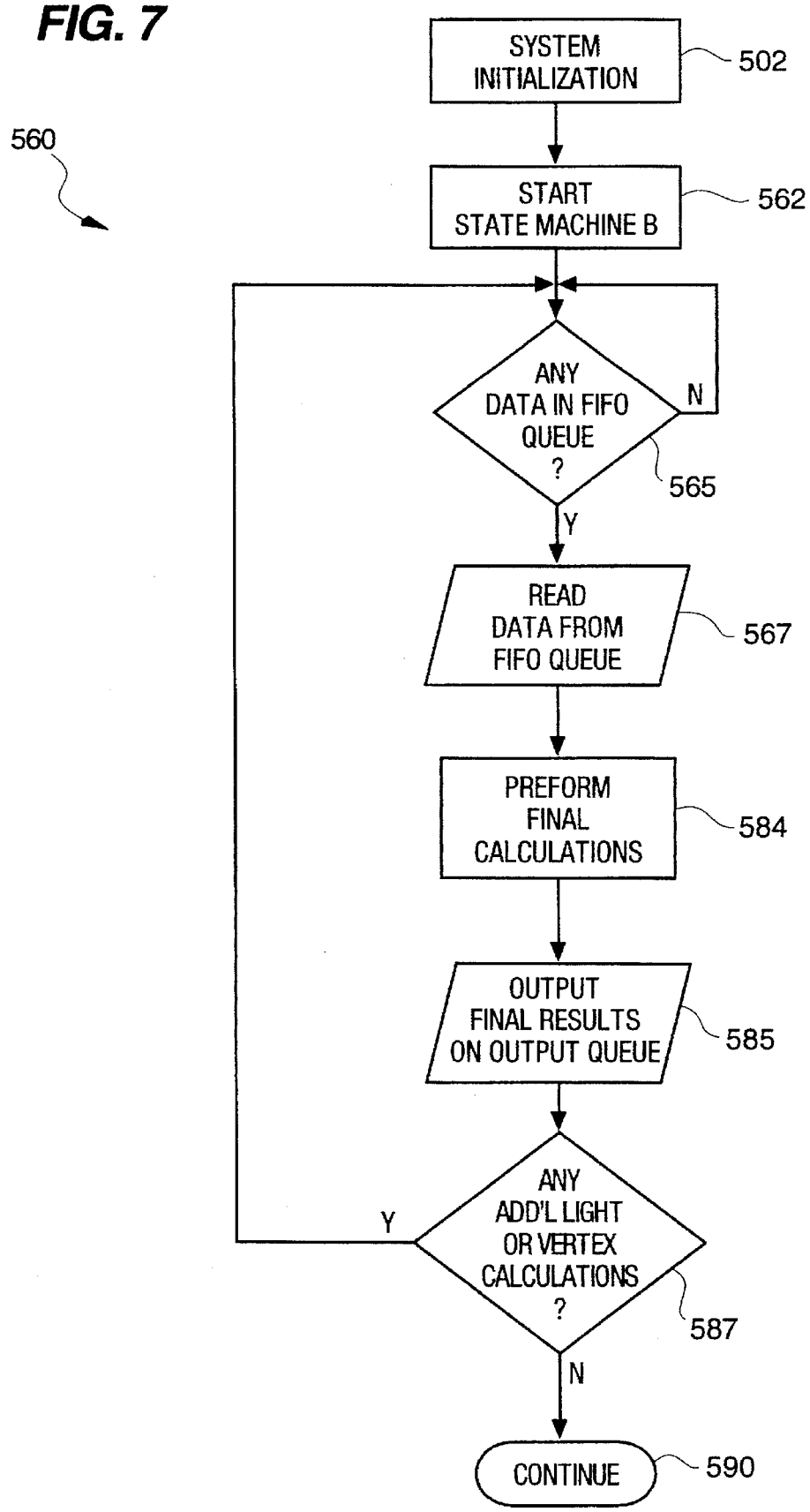
FIG. 7 illustrates operational steps for a read controller in an improved FIFO queuing system in flow diagram form.

Improved FIFO Queuing System—FIGS. 5, 6, and 7

FIG. 5 illustrates an improved FIFO queuing system 400 for a vector processing system such as architecture 100. The FIFO queue 112 serves a first state machine "A" including micro-processor 110 controlled by control units 135, and a second state machine "B" including micro-processor 125 controlled by control units 145. State machines A and B communicate protocol between each other by handshaking control 410 as needed, although, A and B read and write asynchronously relative to each other. Input queue 102 provides primitive data for state machine A to process. Output queue 127 queues processed primitives from state machine B for subsequent distribution to downstream hardware as needed.

State machine A is connected to FIFO queue 112 by a status lead 420 and data path 430. Status lead 420 is used by FIFO queue controller 113 to communicate FIFO queue 112 status to state machine A when state machine A polls FIFO queue controller 113 for such information. Key to the improvement in FIFO queuing system 400 is that status lead 420 is used by FIFO queue controller 113 to return information relating to the amount of available space in the FIFO queue 112. The available space in FIFO queue 112 may be the number of free bytes or words, or derived from the amount of data present in a known size FIFO queue 112. Because state machine A can determine how much data can be stored in an amount of available FIFO queue 112 space, state machine A can poll for FIFO queue 112 status once, and thereafter perform a plurality of calculations that produce a plurality of data items that are written to the available FIFO queue space without repeated polling interruptions prior to each write operation. The result is a more efficient queuing system because the FIFO queue 112 space is known to exist prior to producing data to write to the FIFO queue 112. A data chunk may be written in data item increments to the available data chunk space in the FIFO queue 112, or a data chunk may be written to the FIFO queue 112 as an entire data chunk at one time for additional write operation efficiency. The preferred embodiment writes data in data item increments within a data chunk.

Data path 430 is used by state machine A to write to FIFO queue 112. In the present processing scenario of a three-dimensional quadrilateral primitive having eight lights for each of four vertices, a data chunk includes the results of the eight light source calculations consisting of four pieces of data each for each vertex. That is, only four FIFO queue 112 status request polls are needed to write all of the data items in each data chunk to FIFO queue 112.

State machine B is connected to FIFO queue 112 by a status lead 440 and a data path 450. Status lead 440 is used by FIFO queue 112 to communicate FIFO queue 112 status to state machine B when state machine B polls FIFO queue controller 113 for such information. In the present improvement, status lead 440 is used by FIFO queue controller 113 to communicate information relating to the presence of data in FIFO queue 112. State machine B need only poll for FIFO queue 112 status once to determine if a data chunk is available, and thereafter read data in data item increments for an entire data chunk, or read data in whole data chunk increments for additional read operation efficiency. No repeated polling interruptions occur prior to each read operation. Alternatively, state machine B can poll for FIFO queue 112 status once prior to reading data from the FIFO queue 112, and thereafter never request FIFO queue status for any reason provided that state machine B is known to read data at the same rate or slower than state machine A can write data to the same FIFO queue. In the latter alternative, state machine A obtains a head start writing data to the FIFO queue 112 so that state machine B can continue reading from the FIFO queue 112 without ever catching up with state machine A. In either case, data path 450 is used by state machine B to read data from FIFO queue 112 when state machine B is ready to complete processing.

Based on the FIFO queuing system 400 illustrated in FIG. 5, FIG. 6 illustrates the operational interactions between state machine A and FIFO queue 112. Here, the number of FIFO queue 112 status request polls and/or write accesses required by state machine A to process the quadrilateral primitive using queuing system 400, is 4*1=4 operations. That is, there are four data chunk spaces required for all processing results for each of the four vertices being processed.

State machine A is started at step 503 in FIG. 6 following system initialization at step 503 for the system containing queuing system 400. Once state machine A is initialized and operational, state machine A determines whether there are any primitives available to process at decision step 505. If no primitives are available to process, then state machine A continues to idle at decision step 505. State machine A can continue with other tasks while waiting for a primitive that it can begin processing at decision step 505. When a primitive is available, the primitive is read from the input queue 102 at step 506. Once the primitive is read at step 506, state machine A begins processing the primitive.

As a first step, state machine A polls the FIFO queue controller 113 at decision step 507 to determine if an appropriate-sized FIFO queue 112 data chunk is available. The size data chunk required is determined by the number of calculations available for processing and the number of outputs that will be produced by the calculations. If no data chunk space of the required size is available, state machine A does no further processing on this primitive until a FIFO queue 112 data chunk is available at decision step 507. When FIFO queue 112 data chunk space is available, state machine A performs x-coordinate calculations at step 510 and writes the results to FIFO queue 112 at step 512. The processing and writing continues for the y-coordinate, x-coordinate, and sum of squares of the x-y-z-coordinates, at processing steps 518, 527, and 535, and writing steps 520, 529, and 537, respectively. In the present quadrilateral primitive example having eight lights enabled for each of four vertices, decision step 540 controls the eight light cycles through processing steps 507–537, and decision step 544 controls the four vertex cycles through processing steps 507–540. When all lights for each vertex are processed, processing falls through decision steps 540 and 544, and state machine A begins processing a subsequent primitive at step 548. State machine A can write output as an entire data chunk at one time for additional efficiency, or by data item increments from within a data chunk as in the preferred embodiment.

FIG. 7 illustrates the operational steps as state machine B reads data from the FIFO queue 112. State machine B is started at step 562 following system initialization at step 502 for the queuing system 400. Because state machine B is started at the same time as state machine A following system initialization at step 502, state machine B must repeatedly poll FIFO queue controller 113 at decision step 565 until state machine A finally writes data to FIFO queue 112. State machine B operates asynchronously from state machine A. Once state machine B determines, at decision step 565, that data is available in FIFO queue 112, the data is read from FIFO queue 112 at step 567. Data may be read as an entire data chunk for additional efficiency, or in data item increments from within a data chunk. FIFO queue 112 status may be indicated as the amount of free space in FIFO queue 112, the amount of data present in FIFO queue 112, or whether or not any data is present at all, as a matter of design choice.

Once all data is available to state machine B, final processing is performed at step 584. Results are output to output queue 127 at step 585. Because there are eight light cycles for each of four vertices for the quadrilateral primitive, decision step 587 repeats processing steps 565–585 four times for each of the four vertices. When all four vertices have been processed at decision step 587, state machine B continues processing as needed at step 590.

Figure 9:
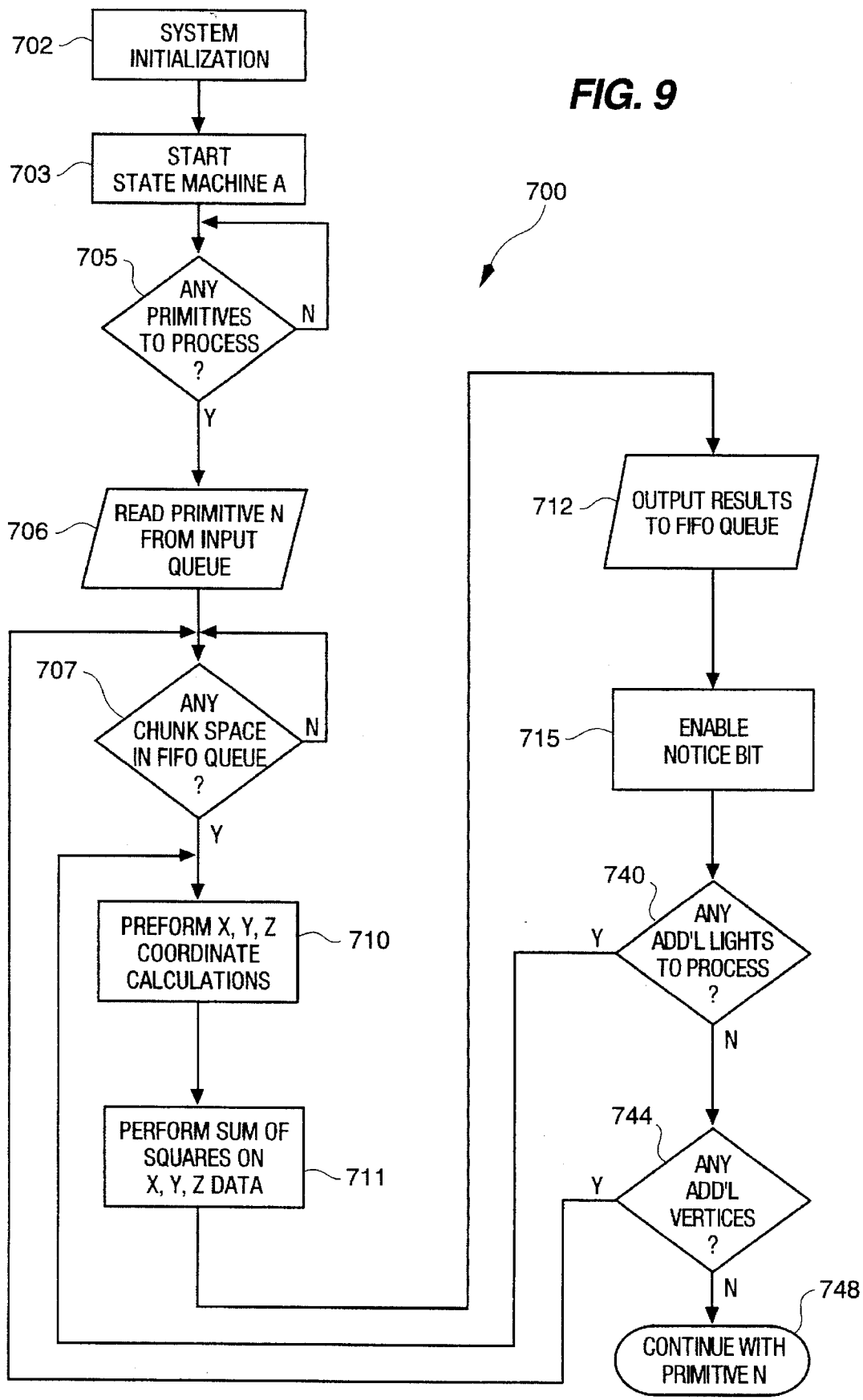
FIG. 9 illustrate operational steps for a write controller in an enhanced FIFO queuing system in flow diagram form.
Figure 10:
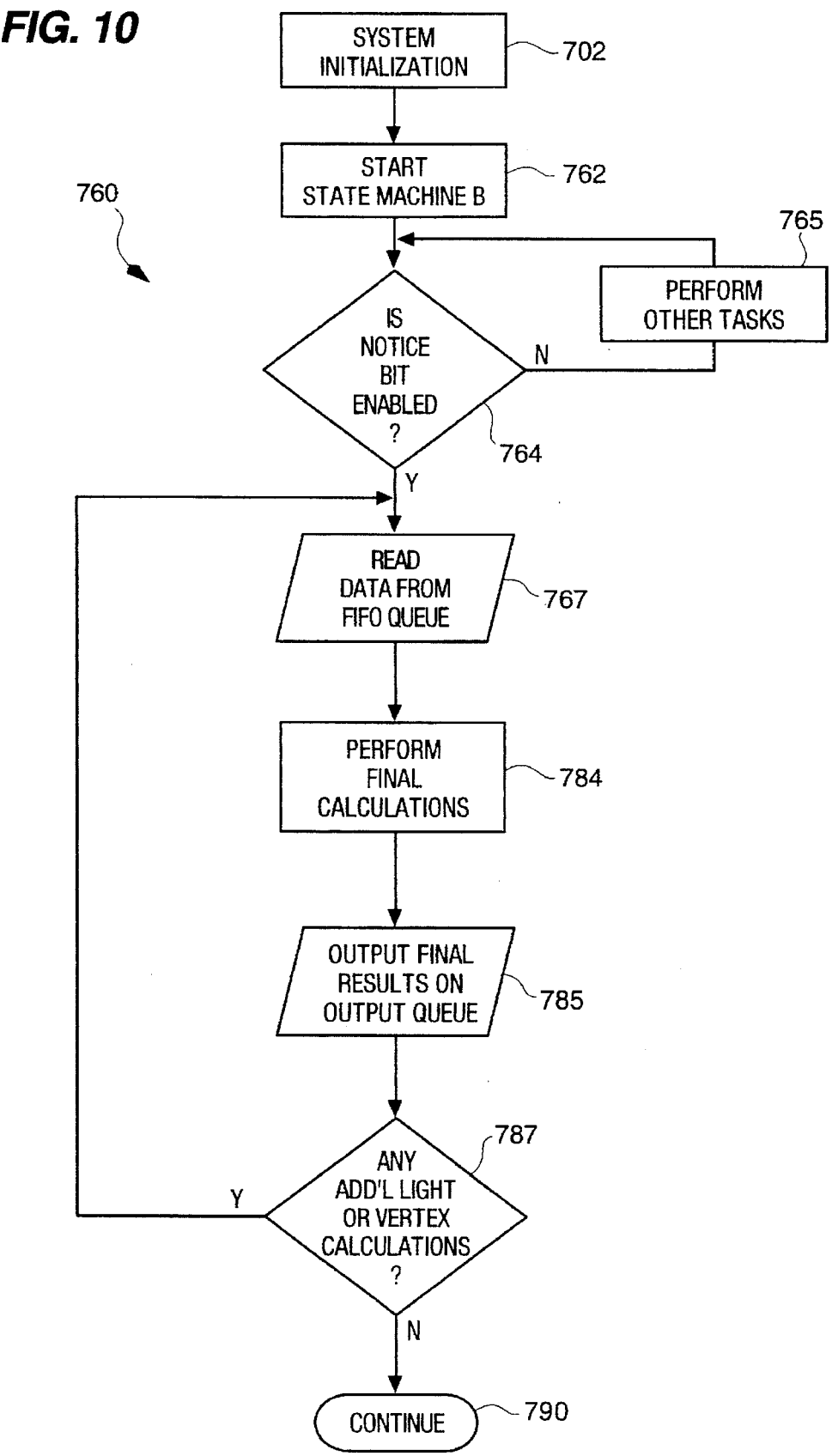
FIG. 10 illustrates operational steps for a read controller in an enchanced FIFO queuing system in flow diagram form.

Preferred FIFO Queuing System—FIGS. 8, 9, 10

FIG. 8 illustrates the preferred FIFO queuing system 600 for a vector processing system such as architecture 100. The FIFO queue 112 serves a first state machine "A" including micro-processor 110 controlled by control units 135, and a second state machine "B" including micro-processor 125 controlled by control units 145. State machines A and B communicate protocol between each other by handshaking control 610 as needed. Input queue 102 provides primitive data for state machine A to process. Output queue 127 queues processed primitives from state machine B for subsequent distribution to downstream hardware as needed.

State machine A is connected to FIFO queue 112 by a status lead 620 and data path 630. Status lead 620 is used by FIFO queue controller 113 to return information relating to the amount of available space in FIFO queue 112. State machine A otherwise performs write operations as previously stated in FIGS. 5 and 6. Data path 630 is used by state machine A to write data to FIFO queue 112.

State machine B is connected to FIFO queue 112 by data path 650 only. No status lead is used between FIFO queue 112 and state machine B because state machine B is controllably started after state machine A so that state machine A will always stay ahead of state machine B. State machine B is started when state machine A signals state machine B by way of a single bit "Go B" lead 605 that is sensed by state machine B. Eliminating FIFO queue 112 status polling further improves processing efficiency and simplifies the state B and FIFO queue controller 113 circuit implementation. Data path 650 is used by state machine B to read from FIFO queue 112 when state machine B is ready to complete processing. Data may be read as an entire data chunk for additional efficiency, or in data item increments from within a data chunk as is done in the preferred embodiment.

Based on the preferred FIFO queuing system 600 illustrated in FIG. 8, FIG. 9 illustrates the operational interactions between state machine A and FIFO queue 112. The number of FIFO queue 112 polls required for state machine A to write to FIFO queue 112 is identical to the discussion in FIG. 6 based on FIG. 5.

State machine A is started at step 703 following system initialization at step 702 for the system containing the preferred FIFO queuing system 600. Once state machine A is initialized and operational, state machine A determines whether there are any primitives available to process at decision step 705. If no primitives are available to process, then state machine A continues to idle at decision step 705. State machine A can continue with other tasks while waiting for a primitive that it can begin to process at decision step 705. When a primitive is available, the primitive is read from the input queue 102 at step 706. Once the primitive is read at step 706, state machine A begins processing the primitive.

As a first step, state machine A polls the FIFO queue controller 113 at decision step 707 to determine if an appropriate sized FIFO queue 112 data chunk is available. The size data chunk required is determined by the number of calculations available for processing and the number of corresponding outputs each calculation will produce. If no data chunk space of the required size is available, state machine A does no further processing on this primitive until FIFO queue 112 data chunk space is available at decision step 707. When FIFO queue 112 space is available, state machine A performs the x-y-z-coordinate calculations at step 710, and the sum of squares of the x-y-z-coordinates at step 711 for all lights in a vertex. Results for processing steps 710 and 711 are written to FIFO queue 112 at step 712. Data can be written as an entire data chunk for additional efficiency, or in data item increments as previously discussed. Not until state machine A reaches step 712 is the "Go B" bit enabled to signal state machine B that state machine A has a sufficient head start and at least one data item from at least one data chunk is available for reading by state machine B. State machine B may be kept from reading until an entire data chunk is written to FIFO queue 112, or only until the first data item within the first data chunk is written depending on the desired state machine A head start. The "Go B" bit remains enabled until state machine A quits processing data and the FIFO queue 112 is empty.

Because the present quadrilateral primitive example has eight lights enabled for each of four vertices, decision step 740 controls the eight light cycles through processing steps 710 and 711, and decision step 744 controls the four vertex cycles through processing steps 707–740. When all lights are processed for each vertex, processing falls through decision steps 740 and 744, and state machine A begins processing a subsequent primitive at step 748.

FIG. 10 illustrates the preferred operational steps for state machine B reading from FIFO queue 112. State machine B is started at step 762 following system initialization at step 702 for the preferred queuing system 600. Note that although state machine B is started at the same time as state machine A following system initialization at step 702, state machine B does not poll FIFO queue controller 113 to determine if a data chunk is available. Instead, state machine B performs other tasks until the "Go B" bit is enabled by state machine A signaling that state machine A has a head start on state machine B and at least one data item within a data chunk is available in FIFO queue 112. State machine B requires no FIFO queue 112 status from FIFO queue controller 113. Once state machine B senses that the "Go B" bit is enabled at decision step 764, the x-y-z-coordinate and sum of squares data are read from FIFO queue 112 at step 767.

Once all data is available to state machine B, final calculations are performed at step 784, and the results output to output queue 127 at step 785. Because there are eight lights for each of four vertices, decision step 787 repeats processing steps 767–785 as needed for each of the four vertices. When all vertices have been processed at decision step 787, state machine B continues processing as needed at step 790.

Summary

The queuing system of the present invention reduces FIFO queue status polling for write operations and eliminates polling for read operations by determining if FIFO queue data chunk space is available prior to writing data, and by delaying the start of the read operations until after the write operations have a head start. While specific embodiments of this invention are disclosed herein, it is expected that those skilled in the art can and will design alternate embodiments of this invention that fall within the scope of the following claims.

What is claimed is:

1. A queuing system in an electronic device, said queuing system having a FIFO queue controlled by a FIFO queue controller, a first device writing to said FIFO queue, and a second device reading from said FIFO queue, said queuing system comprising:

a status generator to produce FIFO queue status that is indicative of a present queue capacity of said FIFO queue by way of said FIFO queue controller, a data write controller portion of said FIFO queue controller to write data to said FIFO queue multiple times in data chunk increments in response to one request for said FIFO queue status if space for at least one data chunk is available in said FIFO queue, wherein said data chunk is a plurality of data items;

a data read controller portion of said FIFO queue controller to read said data from said FIFO queue in at least data item increments asynchronously from said data write controller and in a manner that prevents said data write controller from overflowing said FIFO queue.

2. A queuing system according to claim 1 wherein said FIFO queue status includes information relating to space available in said FIFO queue in a manner selected from the group consisting of: an amount of available space, an amount of non-available space in a known size FIFO queue, and whether any data at all is present in said FIFO queue.

3. A queuing system according to claim 1 wherein said data write controller includes:

a data chunk size indicator to determine a FIFO queue space size required for said data chunk.

4. A queuing system according to claim 1 wherein said data write controller writes said data in a size increment selected from the group consisting of: data chunk, and data item.

5. A queuing system according to claim 1 wherein said data read controller reads said data in a size increment selected from the group consisting of: data chunk, and data item.

6. A queuing system in an electronic device, said queuing system having a FIFO queue controlled by a FIFO queue controller, a first device writing to said FIFO queue, and a second device reading from said FIFO queue, said queuing system comprising:

a status generator to produce FIFO queue status that is indicative of a present queue capacity of said FIFO queue by way of said FIFO queue controller;

a data write controller portion of said FIFO queue controller to write data to said FIFO queue multiple times in data chunk increments in response to said FIFO queue status if space for a data chunk is available in said FIFO queue, wherein said data chunk is a plurality of data items;

a signal from said first device to indicate to said second device that said data is available on said FIFO queue; and a data read controller portion of said FIFO queue controller to asynchronously read said data in at least data item increments from said FIFO queue in response to said signal and at a rate that prevents said data write controller from overflowing said FIFO queue.

7. A queuing system according to claim 6 wherein said FIFO queue status includes information relating to space available in said FIFO queue in a manner selected from the group consisting of: an amount of available space, an amount of non-available space in a known size FIFO queue, and whether any data at all is present in said FIFO queue.

8. A queuing system according to claim 6 wherein said data write device includes:

a data chunk size indicator to determine a FIFO queue space size required for said data chunk.

9. A queuing system according to claim 6 wherein said data write controller writes said data in a size increment selected from the group consisting of: data chunk, and data item.

10. A queuing system according to claim 6 wherein said data read controller reads said data in a size increment selected from the group consisting of: data chunk, and data item.

11. A method for using a queuing system in an electronic device, said queuing system having a FIFO queue controlled by a FIFO queue controller, a first device writing to said FIFO queue, and a second device reading from said FIFO queue, said method comprising the steps of:

providing FIFO queue status by way of a FIFO queue controller, wherein said FIFO queue status includes information relating to an amount of available space available in said FIFO queue;

determining a FIFO queue space requirement for a data chunk, wherein said data chunk is a plurality of data items;

writing data to said FIFO queue multiple times in data chunk increments in response to one request for said FIFO queue status if space for a data chunk is available in said FIFO queue, in response to said step of providing FIFO queue status; and reading said data from said FIFO queue asynchronously from said writing step in a manner that prevents said data write controller from overflowing said FIFO queue, in response to said step of providing FIFO queue status.

12. A method according to claim 11 including:

writing said data in a size increment selected from the group consisting of: data chunk, and data item.

13. A method according to claim 11 including:

reading said data in a size increment selected from the group consisting of: data chunk, and data item.

14. A method for using a queuing system in an electronic device, said queuing system having a FIFO queue controlled by a FIFO queue controller, a first device writing to said FIFO queue, and a second device reading from said FIFO queue, said method comprising the steps of:

providing FIFO queue status by way of a FIFO queue controller, wherein said FIFO queue status includes information relating to an amount of available space in said FIFO queue;

determining a FIFO queue space requirement for a data chunk, wherein said data chunk includes a plurality of data items;

writing data to said FIFO queue multiple times in data chunk increments in response to one request for said FIFO queue status if space for at least one data chunk is available in said FIFO queue, in response to said step of providing FIFO queue status;

signaling said second device that said data is available on said FIFO queue, in response to said writing step; and reading said data from said FIFO queue in a manner that prevents said data write controller from overflowing said FIFO queue, in response to said signaling step.

15. A method according to claim 14 including:

writing said data in a size increment selected from the group consisting of: data chunk, and data item.

16. A method according to claim 14 including:

means for reading said data in a size increment selected from the group consisting of: data chunk, and data item.

17. A queuing system in an electronic device, said queuing system having a FIFO queue controlled by a FIFO queue controller and a first device writing to said FIFO queue, said queuing system comprising:

a status generator to produce FIFO queue status that is indicative of a present queue capacity of said FIFO queue by way of said FIFO queue controller;

a data write controller portion of said FIFO queue controller, to write data to said FIFO queue multiple times in data chunk increments in response to one request for said FIFO queue status if space for a data chunk is available in said FIFO queue, wherein said data chunk is a plurality of data items;

a signal to indicate to said second device that said data is available on said FIFO queue; and a data read controller portion of said FIFO queue controller, to read data from said FIFO queue asynchronously from said data write controller and in a manner that prevents said data write controller from overrunning said data read controller, in response to said signal.

* * * * *